United States Patent
Raja et al.

(10) Patent No.: US 10,860,378 B2
(45) Date of Patent: Dec. 8, 2020

(54) SYSTEM AND METHOD FOR ASSOCIATION AWARE EXECUTOR SERVICE IN A DISTRIBUTED COMPUTING ENVIRONMENT

(71) Applicant: Oracle International Corporation, Redwood Shores, CA (US)

(72) Inventors: Harvey Raja, Manchester (GB); Gene Gleyzer, Lexington, MA (US); Mark Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 15/200,892

(22) Filed: Jul. 1, 2016

(65) Prior Publication Data
US 2017/0004015 A1    Jan. 5, 2017

Related U.S. Application Data

(60) Provisional application No. 62/187,530, filed on Jul. 1, 2015.

(51) Int. Cl.
*G06F 9/50* (2006.01)

(52) U.S. Cl.
CPC .......... *G06F 9/5027* (2013.01); *G06F 9/5033* (2013.01); *G06F 9/5083* (2013.01)

(58) Field of Classification Search
CPC .... G06F 9/5027; G06F 9/5083; G06F 9/5072; G06F 9/5033
See application file for complete search history.

(56) References Cited

U.S. PATENT DOCUMENTS 5,784,569 A    7/1998    Miller
5,819,272 A    10/1998   Benson
(Continued)

FOREIGN PATENT DOCUMENTS

EP    0928089 A2    7/1999

OTHER PUBLICATIONS

Bahman Bahmani, Ashish Goel, Rajendra Shinde, Efficient distributed locality sensitive hashing, Proceedings of the 21st ACM international conference on Information and knowledge management, Oct. 29-Nov. 2, 2012, Maui, Hawaii, USA.*
(Continued)

*Primary Examiner* — Duy Khuong T Nguyen
*Assistant Examiner* — Kevin X Lu
(74) *Attorney, Agent, or Firm* — Tucker Ellis LLP

(57) ABSTRACT

A system and method for supporting an association-aware executor service in a distributed computing environment comprising. The system can provide an executor service associated with a thread pool, the thread pool containing a plurality of threads. The system can receive, at the executor service, a plurality of work requests, each work request being associated with a key of a plurality of keys. The system can define groups of work requests, each group of work requests comprising one or more work requests having a same key. The system can queue, on the plurality of threads in the thread pool, the groups of work requests, each group of work requests being queued on a different thread. All work requests in a particular group are executed on the same thread.

20 Claims, 4 Drawing Sheets

(56) References Cited

U.S. PATENT DOCUMENTS

| | | | |
|---|---|---|---|
| 5,940,367 A | 8/1999 | Antonov | |
| 5,991,894 A | 11/1999 | Lee | |
| 5,999,712 A | 12/1999 | Moiin | |
| 6,182,139 B1 | 1/2001 | Brendel | |
| 6,377,993 B1 | 4/2002 | Brandt | |
| 6,487,622 B1 | 11/2002 | Coskrey | |
| 6,490,620 B1 | 12/2002 | Ditmer | |
| 6,553,389 B1 | 4/2003 | Golding | |
| 6,615,258 B1 | 9/2003 | Barry | |
| 6,631,402 B1 | 10/2003 | Devine | |
| 6,693,874 B1 | 2/2004 | Shaffer | |
| 6,714,979 B1 | 3/2004 | Brandt | |
| 6,952,758 B2 | 10/2005 | Chron | |
| 6,968,571 B2 | 11/2005 | Devine | |
| 7,114,083 B2 | 9/2006 | Devine | |
| 7,139,925 B2 | 11/2006 | Dinker | |
| 7,260,698 B2 | 8/2007 | Hepkin | |
| 7,266,822 B1 | 9/2007 | Boudnik | |
| 7,328,237 B1 | 2/2008 | Thubert | |
| 7,376,953 B2 | 5/2008 | Togasaki | |
| 7,464,378 B1 | 12/2008 | Limaye | |
| 7,543,046 B1 | 6/2009 | Champagne | |
| 7,698,390 B1 | 4/2010 | Harkness | |
| 7,720,971 B2 | 5/2010 | Moutafov | |
| 7,739,677 B1 | 6/2010 | Kekre | |
| 7,792,977 B1 | 9/2010 | Brower | |
| 7,814,248 B2 | 10/2010 | Fong | |
| 7,882,067 B2 | 2/2011 | Saika | |
| 7,953,861 B2 | 5/2011 | Yardley | |
| 8,020,108 B1* | 9/2011 | Roytman | H04L 41/22 |
| | | | 715/762 |
| 8,195,835 B2 | 6/2012 | Ansari | |
| 8,209,307 B2 | 6/2012 | Erofeev | |
| 8,312,439 B2 | 11/2012 | Kielstra | |
| 8,397,227 B2 | 3/2013 | Fan | |
| 8,402,464 B2 | 3/2013 | Dice | |
| 8,595,714 B1 | 11/2013 | Hamer | |
| 9,317,346 B2* | 4/2016 | Schule | G06F 9/544 |
| 9,609,060 B2 | 3/2017 | Kan | |
| 9,690,548 B2* | 6/2017 | Bohm | G06F 8/31 |
| 2002/0035559 A1 | 3/2002 | Crowe | |
| 2002/0073223 A1 | 6/2002 | Darnell | |
| 2002/0078312 A1 | 6/2002 | Wang-Knop | |
| 2003/0023898 A1 | 1/2003 | Jacobs | |
| 2003/0046286 A1 | 3/2003 | Jacobs | |
| 2003/0120715 A1 | 6/2003 | Johnson | |
| 2003/0187927 A1 | 10/2003 | Winchell | |
| 2003/0191795 A1 | 10/2003 | Bernardin | |
| 2004/0059805 A1 | 3/2004 | Dinker | |
| 2004/0153615 A1 | 8/2004 | Koning | |
| 2004/0179471 A1 | 9/2004 | Mekkittikul | |
| 2004/0205148 A1 | 10/2004 | Bae | |
| 2004/0267897 A1* | 12/2004 | Hill | G06F 9/505 |
| | | | 709/217 |
| 2005/0021737 A1 | 1/2005 | Ellison | |
| 2005/0083834 A1 | 4/2005 | Dunagan | |
| 2005/0097185 A1 | 5/2005 | Gibson | |
| 2005/0138460 A1 | 6/2005 | McCain | |
| 2005/0193056 A1 | 9/2005 | Schaefer | |
| 2006/0095573 A1 | 5/2006 | Carle | |
| 2007/0016822 A1 | 1/2007 | Rao | |
| 2007/0118693 A1 | 5/2007 | Brannon | |
| 2007/0140110 A1 | 6/2007 | Kaler | |
| 2007/0174160 A1 | 7/2007 | Solberg | |
| 2007/0237072 A1 | 10/2007 | Scholl | |
| 2007/0260714 A1 | 11/2007 | Kalmuk | |
| 2007/0271584 A1 | 11/2007 | Anderson | |
| 2008/0077622 A1 | 3/2008 | Keith | |
| 2008/0276231 A1 | 11/2008 | Huang | |
| 2008/0281959 A1 | 11/2008 | Robertson | |
| 2009/0144714 A1 | 6/2009 | Fan | |
| 2009/0265449 A1 | 10/2009 | Krishnappa | |
| 2009/0320005 A1 | 12/2009 | Toub | |
| 2010/0064341 A1 | 3/2010 | Aldera | |
| 2010/0128732 A1 | 5/2010 | Jiang | |
| 2010/0211931 A1 | 8/2010 | Levanoni | |
| 2010/0312861 A1 | 12/2010 | Kolhi | |
| 2011/0041006 A1 | 2/2011 | Fowler | |
| 2011/0071981 A1 | 3/2011 | Ghosh | |
| 2011/0107135 A1 | 5/2011 | Andrews | |
| 2011/0113221 A1* | 5/2011 | Vajda | G06F 9/5027 |
| | | | 712/30 |
| 2011/0161289 A1 | 6/2011 | Pei | |
| 2011/0179231 A1 | 7/2011 | Roush | |
| 2011/0249552 A1 | 10/2011 | Stokes | |
| 2011/0252192 A1 | 10/2011 | Busch | |
| 2012/0117157 A1 | 5/2012 | Ristock | |
| 2012/0158650 A1 | 6/2012 | Andre | |
| 2012/0215740 A1 | 8/2012 | Vaillant | |
| 2012/0254118 A1 | 10/2012 | Shah | |
| 2012/0297056 A1 | 11/2012 | Lee | |
| 2013/0047165 A1 | 2/2013 | Goetz | |
| 2013/0263151 A1* | 10/2013 | Li | G06F 9/5083 |
| | | | 718/105 |
| 2015/0058293 A1 | 2/2015 | Kobayashi | |
| 2016/0041855 A1* | 2/2016 | Schule | G06F 9/544 |
| | | | 719/312 |
| 2016/0170812 A1* | 6/2016 | Robison | G06F 9/522 |
| | | | 718/101 |
| 2016/0350157 A1* | 12/2016 | Necas | G06F 9/5038 |
| 2017/0097955 A1* | 4/2017 | Chen | G06F 16/24532 |

OTHER PUBLICATIONS

Vogels, All Things Distributed—Amazon's Dynamo, www.allthingsdistributed.com/2007/10/amazons_dynamo.html, Oct 2007).*

Oracle®, Oracle® Database, JDBC Developers Guide 12c Release 1 (12.1), Jun. 2014, Copyright © 1999, 2014, 520 pages.

European Patent Office, International Searching Authority, International Search Report and Written Opinion dated Jan. 12, 2016 for International Application No. PCT/US2015/052060, 14 pages.

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

* cited by examiner

SYSTEM AND METHOD FOR ASSOCIATION AWARE EXECUTOR SERVICE IN A DISTRIBUTED COMPUTING ENVIRONMENT

CLAIM OF PRIORITY

This application claims the benefit of priority to U.S. Provisional Patent Application No. 62/187,530 filed Jul. 1, 2015 entitled "SYSTEM AND METHOD FOR ASSOCIATED AWARE EXECUTOR SERVICE IN A DISTRIBUTED COMPUTING ENVIRONMENT" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and more particularly to a distributed computing environment.

SUMMARY

A system and method for supporting an association-aware executor service in a distributed computing environment comprising. The system can provide an executor service associated with a thread pool, the thread pool containing a plurality of threads. The system can receive, at the executor service, a plurality of work requests, each work request being associated with a key of a plurality of keys. The system can define groups of work requests, each group of work requests comprising one or more work requests having a same key. The system can queue, on the plurality of threads in the thread pool, the groups of work requests, each group of work requests being queued on a different thread.

In an embodiment, a method for supporting an association-aware executor service in a distributed computing environment comprises providing an executor service associated with a thread pool, the thread pool containing a plurality of threads; receiving, at the executor service, a plurality of work requests, each work request being associated with a key of a plurality of keys; defining groups of work requests, each group of work requests comprising one or more work requests having a same key; and queueing, on the plurality of threads in the thread pool, the groups of work requests, each group of work requests being queued on a different thread.

DETAILED DESCRIPTION

Figure 1:
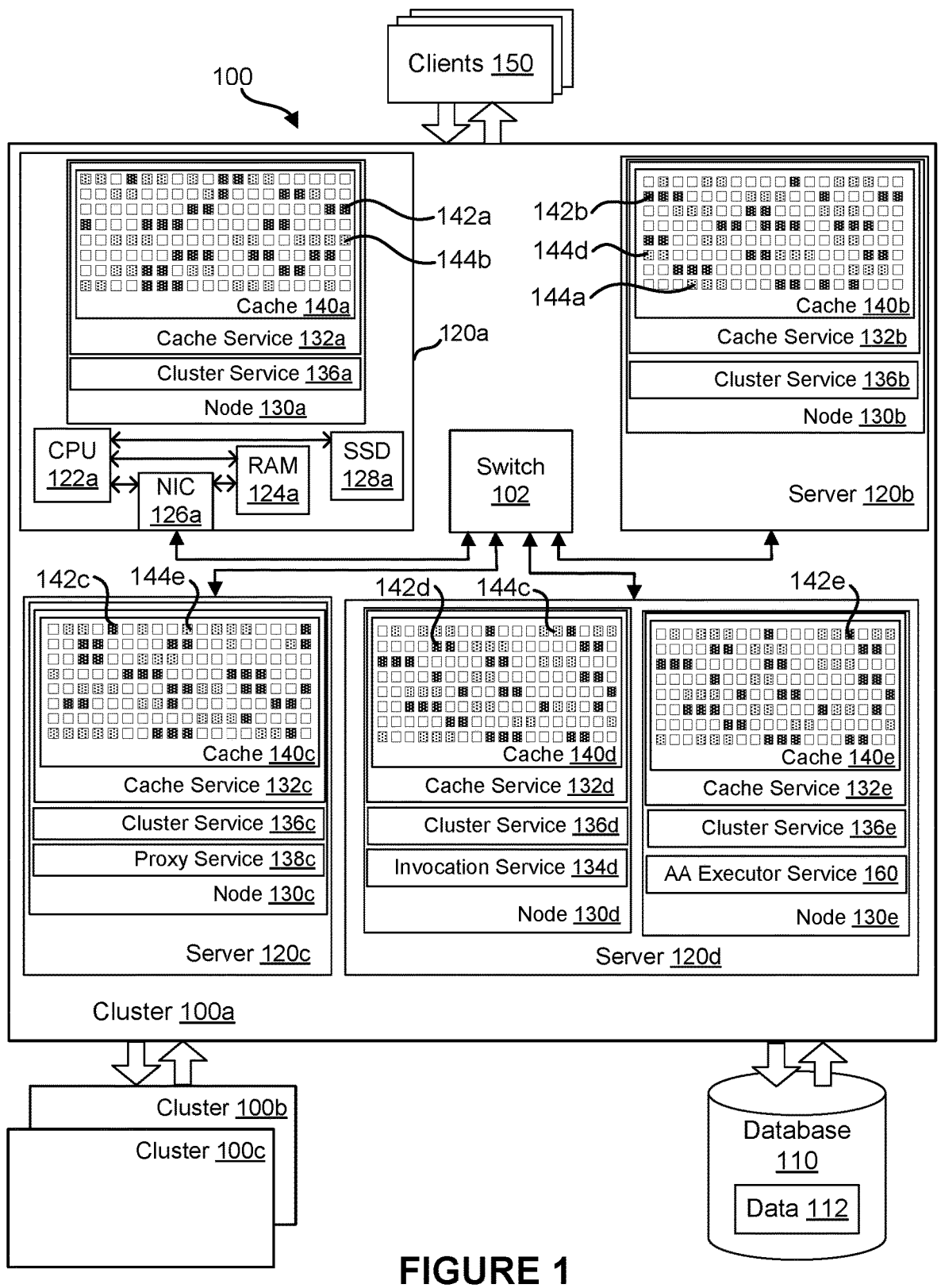
FIG. 1 shows an example of distributed data grid cluster incorporating an association-aware executor service according to an embodiment of the present invention.

Described herein are a system and method for supporting an association-aware executor service in a distributed computing environment comprising, such as a distributed data grid. As described in the description of a distributed data grid which follows, an executor service provided by a node of a distributed data grid uses a thread pool to execute runnable and callable objects. The association-aware executor service enforces a contract which enhances utilization of the thread pool by determining which runnable and callable objects are associated with one another and ensuring that only one associated object is assigned a thread of the thread pool at a time. The association-aware executor service described herein has particular utility in the distributed data grid described below with respect to FIG. 1. An association-aware executor service may also be applied in wide variety of alternative multi-threaded distributed computing environments and applications.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A "distributed data grid" or "data grid cluster" is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computationally intensive, stateful, middle-tier applications. In particular examples, distributed data grids, such as e.g., the Oracle® Coherence data grid, store information in-memory to achieve higher performance, and employ redundancy in keeping copies of the information synchronized across multiple servers, thus ensuring resiliency of the system and continued availability of the data in the event of failure of a computer server in the cluster.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described herein, without departing from the scope of the invention.

FIG. 1 shows an example of a distributed data grid 100 which stores data and provides data access to clients 150. Distributed data grid 100 is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster.

Distributed data grid 100 stores information in-memory (for example in the RAM of each data node) to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, distributed data grid 100 provides data storage and management capabilities by distributing data over a number of computer servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more.

Server 120a of FIG. 1, is illustrated as having CPU 122a, Memory 124a and NIC 126a (these elements are also present, but not shown, in each of the other Servers 120b, 120c, 120d and servers, not shown, of additional clusters). Optionally each server may also be provided with flash memory—e.g. SSD 128a—to provide spillover storage capacity. When provided, the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better). The servers and clusters can be networked using for example high performance Ethernet or InfiniBand networks.

A cluster 100a preferably contains a minimum of four physical servers to avoid the possibility of data loss during a failure, but a typical installation has many more than four servers per cluster. Failover and failback are more efficient when more servers are present in each cluster and the impact of a server failure on a cluster is lessened. To minimize communication time between servers, each data grid cluster is ideally confined to a single switch 102 which provides single hop communication between all of the servers. A cluster may thus be limited by the number of ports on the switch 102. A typical cluster will therefore include between 4 and 96 physical servers networked using a single switch.

In most Wide Area Network (WAN) implementations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid, the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data/messages between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the services provided on nodes of the distributed data gird include, for example, the cluster service, the proxy service, the invocation service, and distributed cache service. The cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster.

According embodiments of the present invention, an association-aware executor service 160 is provided which allows execution of code on a node in the cluster. Although shown on only one node each, the association-aware executor service 160, invocation service and proxy service can be configured on any number up to all of the nodes of the distributed data grid. The association-aware execution service receives tasks including runnable and callable objects in messages from node of the distributed data grid. The association-aware executor service 160 provided by a node of a distributed data grid uses a thread pool to execute the received runnable and callable objects. The association-aware executor service enforces a contract which enhances utilization of the thread pool by determining which runnable and callable objects are associated with one another and ensuring that only one associated object is assigned a thread of the thread pool at a time.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. instances of the distributed cache service operating on each of the nodes manage distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications read and write data to and from the data grid, avoiding expensive requests to back-end data sources such as databases. The shared data cache provides a single, consistent view of cached data. Reading from the cache is faster than querying back-end data sources and scales naturally with the application tier. In-memory data storage alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments, the distributed data grid supports the use of agents to perform operations on the nodes of the distributed data grid. For partitioned data, the agent can be configured to execute on the node (or nodes) that owns the data to execute against. Queuing, concurrency management, agent execution, data access by the agent and data modification by the agent all occur on that grid node. For many processing purposes, it is much more efficient to provide the agent to the node than to handle distributed concurrency control, coherency and data updates. In other words, the Data Grid determines the location to execute the agent based on the configuration for the data topology, moves the agent there, executes the agent (automatically handling concurrency control for the item while executing the agent), backs up the modifications if any, and returns a result.

An entry processor is one example of an agent used to perform an operation on the nodes of the distributed data grid. Other examples of agents/executable code include, but are not limited to: aggregators, filters, value extractors, and invocables. For example an Oracle® Coherence data grid supports a lock-free programming model through the EntryProcessor API. Advantageously, an entry processor performs an implicit low-level lock on the entries it is processing, thereby allowing the client to place processing code in an entry processor without having to worry about concurrency control.

An entry processor can be invoked on a specific key, on a collection of keys, or on a Filter (the Filter is executed against the cache entries and each entry that matches the Filter criteria has the entry processor executed against it). Entry processors are executed in parallel across the cluster (on the nodes that own the individual entries.) This provides a significant advantage over having a client lock all affected keys, pull all required data from the cache, process the data, place the data back in the cache, and unlock the keys. The processing occurs in parallel across multiple computers (as opposed to serially on one computer) and the network overhead of obtaining and releasing locks is eliminated. The code of the entry processor for execution against the chosen entries is transmitted into the distributed data grid. For many transaction types, the use of entry processors minimizes contention and latency and improves system throughput, without compromising the fault-tolerance of data operations.

For example, an agent can be created on a client 150 of the distributed data grid 100 shown in FIG. 1. In order to execute the agent, the agent is serialized and transmitted to one or more node in the distributed data grid 100. To serialize an object means to convert its state to a byte stream so that the byte stream can be reverted back (deserialized) into a copy of the object. Deserialization is the process of converting the serialized form of an object back into a copy of the object.

Code Execution in a Distributed Data Grid

In the Java® programming language, an Executor is a simple interface that supports launching new tasks, ExecutorService is a subinterface of Executor, which adds features which help manage the lifecycle of the individual tasks and the executor itself; and ScheduledExecutorService is a subinterface of ExecutorService which supports future and/or periodic execution of tasks. The ExecutorService interface represents an asynchronous execution mechanism which is capable of executing tasks in the background. The implementation of ExecutorService is a thread pool implementation.

A distributed data grid, as described above, is configured to process very large numbers of short tasks received from clients. For example, an executor service may be configured to process very large numbers of tasks in the form of runnable and callable objects in requests received from threads on nodes throughout the network. The processing of each task is short-lived, however, the number of tasks is very large. In order to efficiently process the very large number of short-lived tasks, an executor service can utilize a thread pool of worker threads.

If the number of tasks is very large, such as in a distributed data grid, then creating a thread for each task is impractical. Moreover if the size of the tasks is small, the overhead associated with creating and destroying a thread is more significant relative to the actual work performed. In a thread pool, worker threads are recycled instead of created on demand as tasks are received. Using a thread pool of worker threads is advantageous compared to creating new worker threads for each task because a thread pool allows reusing threads for multiple operations, thus the overhead associated with thread-creation and removal is spread over many operations. Reduced overhead for thread creation and destruction may result in better performance and better system stability. As an additional advantage, processing of a task is not delayed by the need to create a new thread to process it. Typically, there are many more tasks than threads. As soon as a thread completes its task, it will request the next task from the queue until all tasks have been completed. The thread can then terminate, or sleep, until there are new tasks available. The number of threads in a thread pool can either be fixed or dynamically changed based on workload.

The executor service this provides an abstraction in submitting tasks to be executed instead of directing the tasks directly at a thread pool. The executor service can be used for the execution of runnable and callable objects (code). The executor service is configured to run a plurality asynchronous tasks and manage a thread pool so that threads do not have to be created for each new task. The threads of the thread pool are reused such that many concurrent tasks can be executed with a single executor service. The executor service implementation can be backed by a fixed-size or dynamic thread pool. In a dynamic thread pool, the number of threads available may vary depending upon, for example, the workload of the system.

When implementing a thread pool, thread-safety has to be taken into account. Tasks related to the same resource must be performed in order. If multiple threads pick up tasks related to the same resource, only one of those thread will be able to proceed at a time while the other threads are blocked (while waiting for access to the resource). This is a disadvantageous because it negates the purpose of multiple threads—namely having multiple threads operating in parallel. Therefore techniques are required to ensure first-in-first-out FIFO ordering of tasks and prevent thread blocking. It is therefore desirable to provide a data structure for allowing an executor service, in particular, to provide work to worker threads in a way that reduces and/or eliminates contention/blocking and/or ensures in order execution of associated tasks.

Association-Aware Executor Service

In a conventional implementation of an executor service, submitted tasks can be executed on any thread of the thread pool available to the executor service. The submitted tasks are considered entirely independent in the conventional implementation. This is disadvantageous where, for example, a shared state (for example a particular datum in a distributed cache) is attempted to be modified by multiple tasks. A lock is used to protect the critical section of the shared state so that only one contending task can mutate the shared state at a time. The result of the lock is that only one of the contending tasks can proceed at a time. The other contending tasks, and the threads to which they are assigned, are blocked until the lock is released. This reduces the performance of the system as a whole by preventing the blocked and idled threads from performing other work for which there is no contention (i.e. tasks directed at other state data such as another datum in the distributed cache).

In a conventional implementation of an executor service, when multiple work requests were received at a thread pool, each work request is assigned to any available thread. In certain situations, the work requests could be related, such as by requiring access to a shared state. A first processed request acquires exclusive access to the shared state. Subsequent tasks are assigned to available threads but then those threads are blocked until the resource is available, thus resulting in idling threads and a backlog of work requests. Moreover where the number of threads are limited, the entire pool (−1 thread) may be blocked with related tasks while other non-related tasks are queued waiting for a thread.

For example, in a certain situation, four work requests are received concurrently at a static thread pool having four available threads, e.g., work threads. The four received work requests are each associated with the same key, and can only be processed one at a time. As all four work requests will be assigned to a different thread, all four threads will be consumed, three of which will be idle as the first of the work requests is processed. This problem can be exacerbated further when the work requests receive a lock, e.g., a 10 second lock, thus locking all four threads for an extended period of time and not allowing other, non-related work requests to be performed.

In embodiments, the present invention implements an association-aware executor service 160. The association-aware executor service performs the functions of the conventional executor service described above and additionally, groups tasks associated with e.g. a particular shared state, and serializes them such that only one thread is consumed by each group of associated tasks, with each task waiting until the prior task is completed before it is assigned to the thread. In general, where various tasks are submitted to the single entry point of the association-aware executor service which has access to multiple threads to perform the tasks, the association-aware executor service checks to see if anything else having same association is running and waits till it finishes execution before starting another task with the same association. Tasks that are effectively blocked because they contend with an already executing task for the shared state are not assigned a thread until the executing task is complete. This prevents the thread pool from becoming saturated with blocked threads. The determination of which tasks are associated can be made based on a number of factors defined in a contract implemented by the association-aware executor service.

For example in the distributed data grid of FIG. 1, the distributed cache holds a collection of data objects. Each data object/datum can be, for example, the equivalent of a row of a database table. Each datum is associated with a unique key which identifies the datum. Where multiple tasks are directed to modifying the same datum in the distributed cache, each of the tasks will be associated with the unique key which identifies that datum. The tasks can be for example defined in messages where each the message includes a key in the header or the body which identifies the datum to which the task relates. Accordingly, the association-aware executor service group tasks associated with a particular datum and its unique key, and serializes them such that only one thread is consumed by the group of tasks associated with the particular datum, with each other task waiting until the preceding task is completed before it is assigned to the thread in order to operate on the datum. In a distributed data grid such as an Oracle® Coherence distributed data grid, many tasks can be submitted against a datum (and its unique key concurrently). Using an association-aware executor service, as described herein the distributed data grid avoids over assignment of thread(s) for contentious tasks. Rather than saturate a thread pool with blocked threads, thus stopping progress on uncontended tasks, tasks with the same association are deferred until the currently executing task is completed.

Figure 2:
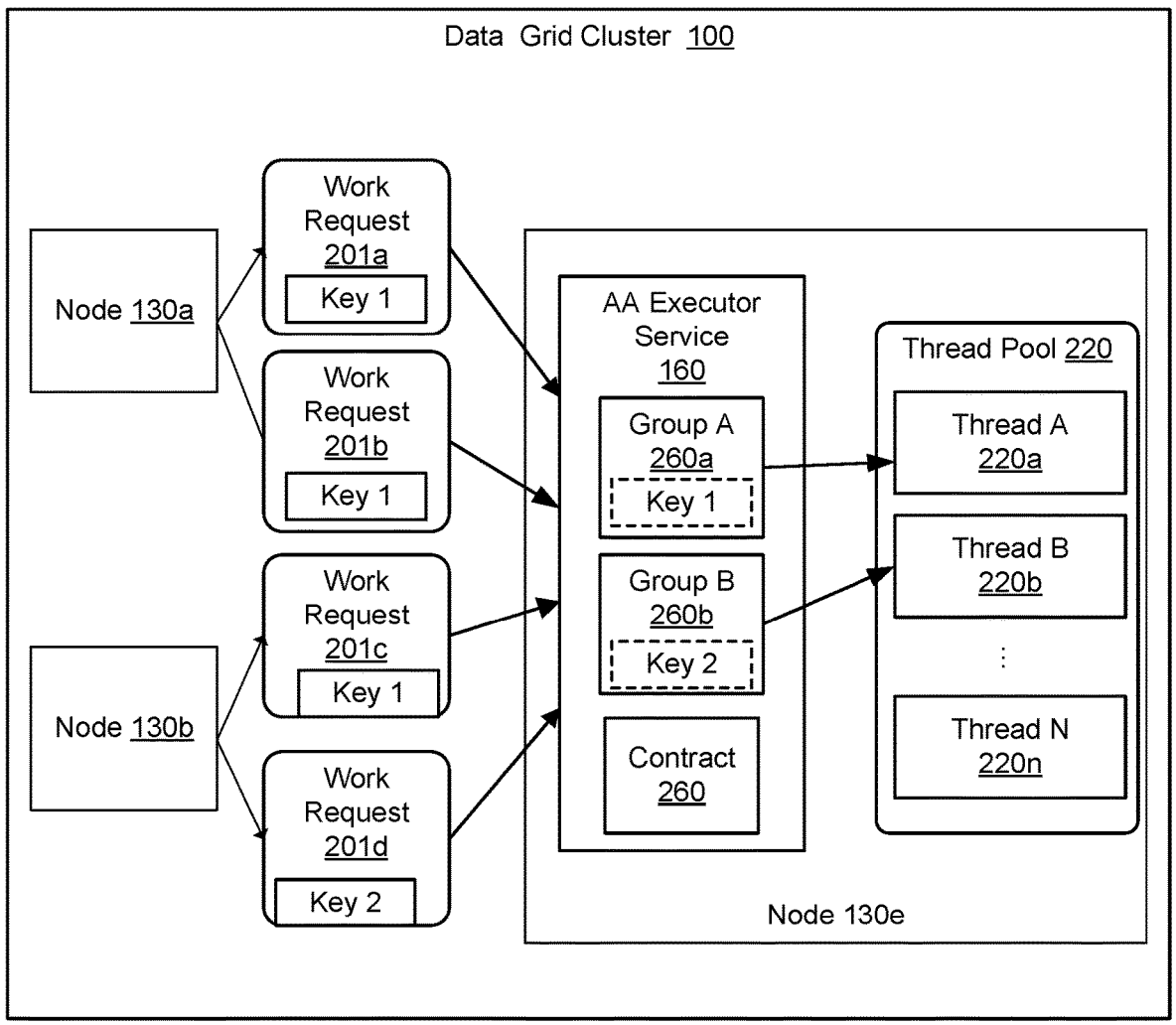
FIG. 2 shows an overview of an association-aware executor service in a distributed computing environment, according to an embodiment of the present invention.

FIG. 2 shows an overview of one embodiment supporting an association-aware executor service 160 in a distributed computing environment. Association-aware executor service 160 provides an abstraction in submitting tasks to be executed, possibly in parallel in a distributed data grid cluster 100 as shown, for example in FIG. 1. Association-aware executor service 160 allows submission of a runnable or callable object for execution on a thread at some point in the future either on another thread or on the same thread of a thread pool 220 associated with node 130e of data grid cluster 100. The runnable and callable objects are independent tasks that to be executed however, they are in some instances associated with other tasks.

Association-aware executor service 160 provides for more efficient use of available threads 220a, 220b-220n in a thread pool 220 compared to an executor service which is association agnostic. In accordance with an embodiment, a contract 260 associated with the association-aware executor service 160 provides the rules associated with queueing and ordering of work requests. The contract 162 used by an association-aware executor service is defined to associate work requests with the same key or other signaling information, and then place associated work requests on a same thread, thus ensuring that other threads remain open for non-associated work requests. This association-aware feature provides for more efficient use of available threads in the thread pool 220. The execution of concurrent work (unrelated) requests can be performed in parallel or asynchronously thereby improving performance of the distributed data gird cluster.

As shown in FIG. 2, the distributed data grid 100 include an executor service 160 operating on one or more nodes 130e. Executor service 160 is associated with a thread pool 220 including a plurality of thread 220a, 220b-220n for performing work assigned by the executor service. The thread pool 220 can either be dynamic (containing a variable number of threads) or static (containing a fixed number of threads). Processes/threads on various other nodes (or clients 150 of FIG. 1) in the distributed data grid cluster 100 send work requests 201a, 201b, 201c, 201d over the network of the distributed data grid cluster 100 destined for the executor service 160 on node 130e (note that instances of the executor service may be operating on some or all of the nodes of the distributed data grid cluster 100). These work requests are in the form of runnable and/or callable objects transmitted to executor service 160. The executor service includes a contract 260, which defines how the work requests are routed through the executor service 160 for execution on the threads of thread pool 220.

In accordance with an embodiment of the invention, the executor service 160 provides an abstraction in submitting tasks to the thread pool 220 to be executed. The submitted work requests 201a, 201b, 2012c, 201d can each be associated with a key, with several tasks being capable of being associated with a same key. As shown in FIG. 2, three of the four work requests 201a, 201b, 201c are associated with key 1, while a fourth work request 201d is associated with key 2. The nature of the key or other signal used to associate tasks will depend upon the application and the contract. In one embodiment, for example in the distributed data grid of FIG. 1, the distributed cache holds a collection of data objects where each datum is associated with a unique key. Thus the key 1 and key 2 may each represent the unique key of a datum in the distributed cache of node 130e against which the tasks are set to operate.

The executor service 160, based upon the defined contract 260, groups the work request into several groups 260a, 260b. For example, the executor service 160 may define a separate group for each thread of the thread pool 220. The executor service 160 then routes associated tasks (i.e. tasks associated with the same key) into the same group such that they are destined for processing on a single thread in order to prevent backlog and idle threads. As depicted in FIG. 2, the three work requests associated with key 1 are routed into group A 260a, to be queued onto one of the threads 220a in the thread pool 220, while the fourth work request associated with key 2 can be grouped into group B 260b, which is queued onto a different thread 220b in the thread pool 220.

The advantages of the association-aware executor service can be observed from an example. For example, the data grid cluster can send out four work requests, three of which are associated with key 1 and one of which is associated with key 2. In this example, there are three available threads in the thread pool 220, and the three work requests 201a, 201b, 201c associated with key 1 are received at the executor service 160 before the work request 201d associated with key 2. The executor service will queue the three work requests associated with key 1 on one work thread A 220a. Only one work request associated with key 1 will be allowed to proceed at a time on Thread A 220a. This permits the work request 201d associated with key 2 (and other work requests not associated with either key 1 or key 2) to run in parallel on one of the two remaining work threads, instead of having to wait behind the work requests associated with key 1. Essentially associated tasks are grouped and the serialized onto a single thread such that they are performed one at a time thereby preventing contention between associated tasks from idling threads which could be used for other work.

Example 1 provided below illustrates code for implementing an association-aware executor service. As shown, class DoSomethingContentious implements both Associated and Runnable. DoSomethingContentious includes a string and an association parameter (s Association). The association parameter is extracted and f_sAssociation is set to as some function of the association parameter. The function ensures that all runnables having the same association parameter end up in the same group. The function also distributes incoming tasks having different association parameters across the available threads/groups. Then getAssociatedKey( ) can be used to return f_sAssociation which equals the appropriate group number for the runnable. In this example runnable merely implements a five second delay "Thread.sleep (5000L)" for exemplary purposes.

Example 1

```
class DoSomethingContentious
    implements Associated, Runnable
{
public DoSomethingContentious(String sAssociation)
{
f_sAssociation = sAssociation;
}
@Override
public Object getAssociatedKey( )
{
return f_sAssociation;
}
@Override
public void run ( )
{
try
{
Thread.sleep(5000L);
}
catch (InterruptedException e) { }
}
final String f_sAssociation;
}
```

AssociationAwareExecutor=new AssociationAwareExecutor(4, newThreadGroup("AssociatedExecutor"));
executor.scheduleAssociation(new DoSomethingContentious("group-1")); run on thread-1
executor.scheduleAssociation(new DoSomethingContentious("group-1")); executed after 5 s on thread-1
executor.scheduleAssociation(new DoSomethingContentious("group-2")); run on thread-2
executor.scheduleAssociation(new DoSomethingContentious("group-2")); executed after 5 s on thread-2

When AssociationAwareExecutor of Example 1 is initialized, it is initialized with (for example) four threads and four groups. For each submitted DoSomethingContentious the runnable is assigned to the appropriate group and limited to running on a particular thread assigned to the group. Thus the second DoSomethingContentious in group 1 must wait until after the first DoSomethingContentious in group 1 has completed (i.e. after the five second delay has completed). NB the five second delay is a stand-in for the work performed by the task—in actuality this work will typically involve mutation of a datum. Likewise the second DoSomethingContentious in group 2 must wait until after the first DoSomethingContentious in group 2 has completed (i.e. after the task, e.g. the five second delay has completed). In this way, the AssociationAwareExecutor ensures that associated tasks are run on the same thread and avoids blocking the other threads when the associated tasks contend on a shared state (for example the same datum in a distributed cache of the distributed data grid.

Figure 3:
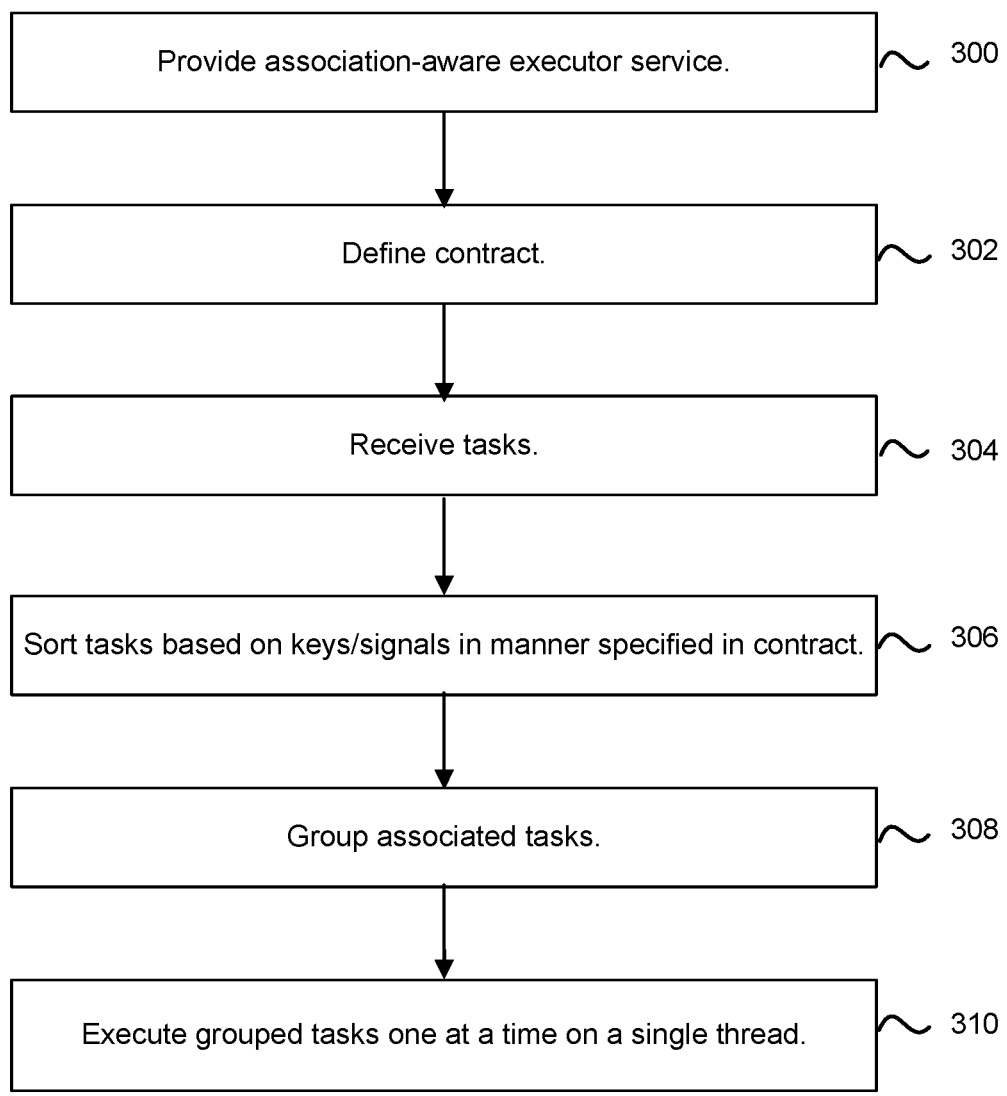
FIG. 3 illustrates a method of operating an association-aware executor service in a distributed computing environment, according to an embodiment of the present invention.

FIG. 3 illustrates a method of operating an association-aware executor service in a distributed computing environment, according to an embodiment of the present invention. As shown in FIG. 3, at step 300 and association-aware executor service is provided. At step 302, a contract is defined for the association-aware executor service. The contract defines which tasks should be considered to be associated based on keys and/or other signals included in the tasks. At step 304 tasks are received at the association-aware executor service. At step 306, the keys and/or other signals in the tasks and the association-aware executor service makes a determination, based on the contract, whether the tasks should be associated. At step 308, the association-aware executor service group tasks that are associated. At step 310, the association-aware executor service executes tasks in each group one at a time on a single thread which is used for all tasks in the group.

In accordance with an embodiment, the association-aware executor service can also be configured to provide for asynchronous execution of work requests. For example, for a given number of tasks/work requests, there can be a causality between the requests, e.g., an order of operations where the result will be different if the tasks/work requests are not performed in a specific order, the executor service can provide in-order execution for asynchronous execution. However, where, for example, a sending thread transmits the tasks (runnable/callable objects) to a conventional executor service, the conventional executor service will assign the tasks to any available thread as soon as they are received. Accordingly, there is no guarantee that the tasks will be performed in the specific order.

To overcome this problem, the association-aware executor service can use a thread ID of the sending thread as an association key, e.g., a key used for associating tasks. For example the tasks can be defined in messages where each message includes, in the header or the body, the thread ID of the sending thread. The association-aware executor service then uses the thread ID of the sending thread to group tasks originating from the sending thread. All the tasks in a particular group are confined to a single thread in the thread pool. If a task is executing, additional tasks originating from the same sending thread are queued. When the executing task is completed, the next task in the queue is submitted to the thread. This allows the association-aware executor service to ensure in-order execution of the tasks in the particular group. To put it another way, the executor service ensures that the associated tasks are serialized and performed on a single thread in the required specific order. Thus, in the above example, the executor service can ensure that the three work requests associated with key \foo are queued in the required specific order onto one work thread, and performed one after the other, thus ensuring in-order execution of the he three work requests associated with key \foo.

In an embodiment, to guarantee the correct order of execution of asynchronous requests emitted by a client thread, the system generates a synthetic association key that combines the JVM id (AKA cluster node id) and the system identity of the client thread calculated via standard JDK System.identityHashCode(Thread.currentThread( )) API. Combining this synthetic association with the partition awareness of the invocation requests ensures that for any given server that owns one or more partition for which a request is issued all the requests from a given client thread will execute in exactly the same order as they are emitted. To put it another way, each client thread issued requests will have a unique synthetic association key such that the executor service can ensure that all requests from the client thread are assigned to same group of requests and executed on the same thread in exactly the same order as they are emitted by the client thread.

Figure 4:
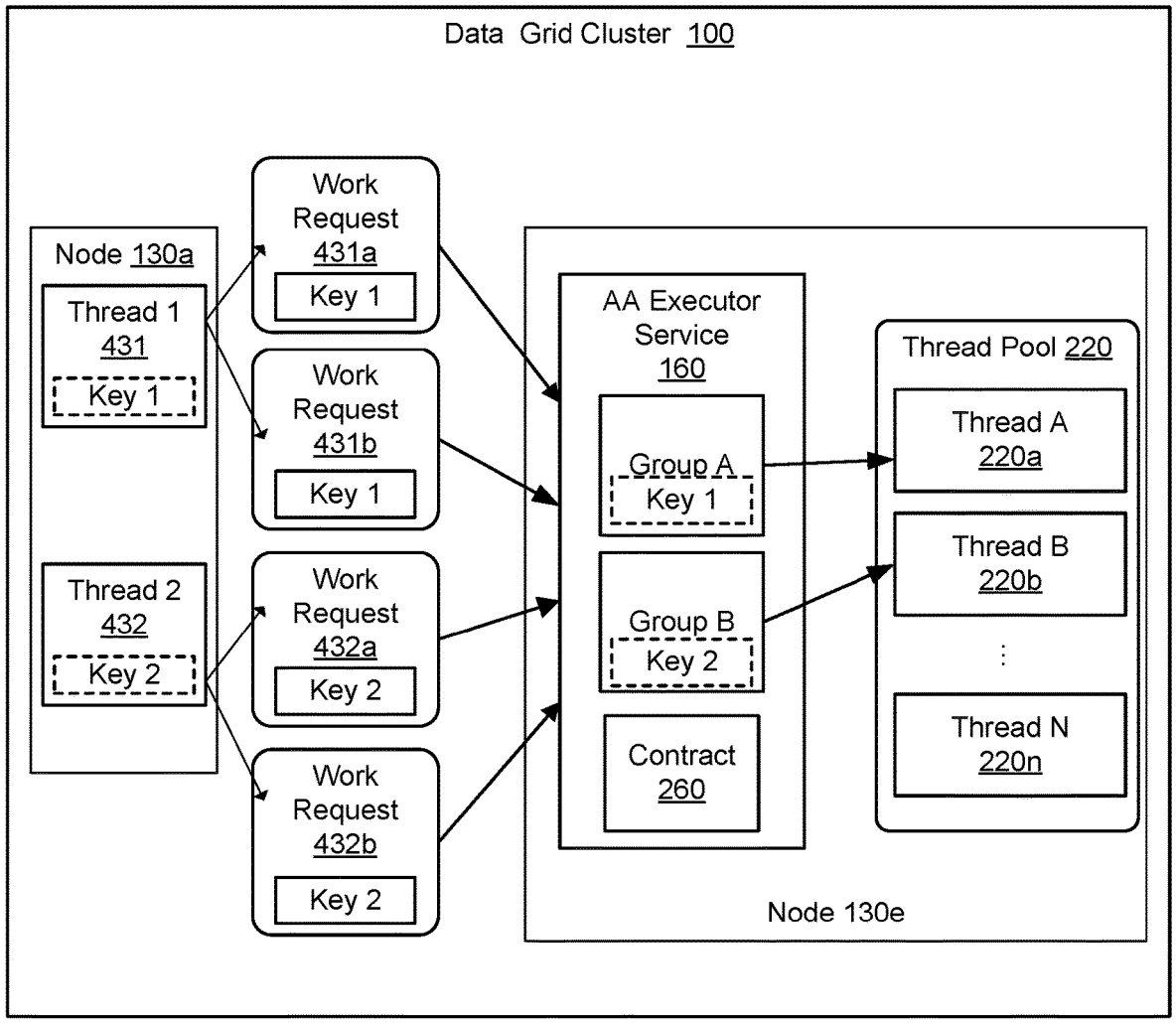
FIG. 4 shows an overview of an association-aware executor service used for in-order execution of tasks in a distributed computing environment, according to an embodiment of the present invention.

FIG. 4 shows an overview of an association-aware executor service used for in-order execution of tasks in a distributed computing environment, according to an embodiment of the present invention. As shown in FIG. 4, a node 130a may operate different processes represented by calling threads e.g. Thread 1, 431 and Thread 2, 432. The calling threads generate work requests which are sent over then network to association-aware executor service 160 on node 130e. Each runnable/callable in the work requests is an independent task. Work request 431 is issued before work request 431b. Work request 432a is issued before 432b. The network ensure that the work tasks are received at the executor service 160 in the order they are transmitted. However, if the executor service is not association aware it is possible that, for example work request 432a and work request 432b could be assigned to different threads thus raising the possibility that work request 432b could be completed before work request 432a (out of order).

In order to ensure in-order execution, the work requests each include a key which identifies the calling thread which originated the work request. Work requests 431a and 431b include key 1 which identifies Thread 1, 431. Work requests 432a and 432b include key 2 which identifies Thread 2, 432. Upon receiving the work requests, association-aware executor service 166 examines the keys and determines that work requests having the same key are associated based on contract 260. The association-aware executor service then groups/queues associated tasks. All tasks associated with key 1 are queued in group A, and all tasks associated with key 2 are queued in group B. The association-aware executor service then assigns tasks in the same group one-at-a-time and in-order on a single thread. All tasks from Group A are executed on Thread A 220a whereas all tasks from group B and executed on Thread B 220b. This ensures that the tasks from Thread 1 and Thread 2 are executed in the order received by the Executor Service.

While various embodiments of the present invention have been described above, it should be understood that they have been presented by way of example, and not limitation. It will be apparent to persons skilled in the relevant art that various changes in form and detail can be made therein without departing from the spirit and scope of the invention.

It is also noted that, while for purposes of illustration, the above description is provided largely in the context of using the Java™ programming language (or a language closely related to Java™), the techniques described may be used for any programming language that supports Lambda expressions, overloading of invocation operations such as methods, constructors, or functions. The techniques may be used for object-oriented languages in some embodiments, or for non-object-oriented languages (such as various procedural languages) in other embodiments.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting execution of tasks on each of a plurality of computer systems in a distributed computing environment, the method comprising:

providing on each of the plurality of computer systems, an executor service and a thread pool containing a plurality of threads, wherein the executor service on each of the plurality of computer systems is associated with the thread pool on said each of the plurality of computer systems;

receiving, at a particular executor service on a particular computer system of said plurality of computer systems, a plurality of work requests, each work request being associated with a key of a plurality of keys and wherein each of the plurality of keys identifies a particular datum in the distributed computing environment;

defining a plurality of groups of work requests on the particular computer system, each group of work requests comprising one or more work requests having a same key of the plurality of keys; and queueing, on the plurality of threads in the thread pool associated with the particular executor service on the particular computer system, the groups of work requests, each group of work requests being queued on a different thread;

whereby said particular executor service ensures that each of said plurality of work requests associated with the particular datum are processed on a same particular thread of the plurality of threads.

2. The method of claim 1, further comprising:
receiving the plurality of work requests in a plurality of messages each comprising one of the plurality of work requests and one of the plurality of keys.

3. The method of claim 1, wherein the distributed computing environment stores each datum of a data set as a key/value pair.

4. The method of claim 1, wherein:
each of the plurality of work requests received at the particular executor service on the particular computer system of said plurality of computer systems is with a key of the plurality of keys which identifies a particular datum in the distributed computing environment stored on said particular computer system.

5. The method of claim 1, wherein:
each of the plurality of keys represents a thread ID of work request generating thread; and
wherein the executor service ensures that each of said plurality of work requests generated by a particular work request generating thread are processed on a same particular thread of the plurality of threads thereby ensuring in-order execution of said each of said plurality of work requests generated by a particular work request generating thread.

6. The method of claim 1, further comprising defining a contract which specifies which work request of said plurality of work requests should be associated with which of said plurality of groups of work requests.

7. The method of claim 6 wherein queueing, on the plurality of threads in the thread pool, the groups of work requests, each group of work requests being queued on a different thread is performed with reference to said contract.

8. The method of claim 1, further comprising executing on a single thread of said plurality of threads all work requests in one of said plurality of groups of work requests.

9. The method of claim 1, wherein said plurality of work requests comprises a plurality of callable and runnable objects for execution by said executor service.

10. The method of claim 1, further comprising providing said executor service on a plurality of nodes of the distributed computing environment for execution of runnable and callable objects received in said plurality of work requests from other of said plurality of nodes of the distributed computing environment over a network.

11. A system for supporting execution of tasks, the system comprising:
a distributed computing environment comprising a plurality of computer systems each comprising a microprocessor and a memory;
an executor service operating on each of said plurality of computer systems, wherein each said executor service is associated with a respective thread pool on each of said plurality of computer systems, wherein each respective thread pool comprises a plurality of threads;
wherein each particular executor service operating on a particular computer system is configured to receive a plurality of work requests, each work request being associated with a key of a plurality of keys and wherein each of the plurality of keys identifies a particular datum in the distributed computing environment;
wherein said each particular executor service is configured to define a plurality of groups of work requests on said each particular computer system, each group of work requests comprising one or more work requests having a same key; and
wherein said each particular executor service is configured to queue, on the plurality of threads in the respective thread pool on said each particular computer system of said plurality of computer systems, the groups of work requests, each group of work requests being queued on a different thread;
whereby said each particular executor service ensures that each of said plurality of work requests associated with a particular datum are processed on a same particular thread of the plurality of threads.

12. The system of claim 11, wherein:
the executor service is configured to receive the plurality of work requests in a plurality of messages each comprising one of the plurality of work requests and one of the plurality of keys.

13. The system of claim 11, wherein the distributed computing environment stores each datum of a data set as a key/value pair.

14. The system of claim 11, wherein:
each of the plurality of work requests received at each particular executor service is associated with a key of the plurality of keys which identifies a particular datum in the distributed computing environment stored on the particular computer system on which said particular executor service operates.

15. The system of claim 11, wherein:
each of the plurality of keys represents a thread ID of work request generating thread; and
wherein the executor service is configured to ensure that each of said plurality of work requests generated by a particular work request generating thread are processed on a same particular thread of the plurality of threads thereby ensuring in-order execution of said each of said plurality of work requests generated by a particular work request generating thread.

16. The system of claim 11, further comprising:
a contract associated with the executor service wherein the contract which specifies which work request of said plurality of work requests should be associated with which of said plurality of groups of work requests.

17. The system of claim 11, wherein the executor service makes reference to said contract when queueing, on the plurality of threads in the thread pool, the groups of work requests.

18. The system of claim 11, wherein the executor service is configured to execute on a single thread of said plurality of threads all work requests in one of said plurality of groups of work requests.

19. The system of claim 1, wherein said plurality of work requests comprises a plurality of callable and runnable objects for execution by said executor service.

20. A non-transitory computer readable medium having instruction stored thereon for supporting execution of tasks on each of a plurality of computer systems in a distributed computing environment, which instructions when executed on a node in the distributed computing environment, cause the node to perform steps comprising:

provoding on each of the plurality of computer systems, an executor service and a thread pool containing a plurality of threads, wherein the executor service on each of the plurality of computer systems is associated with the thread pool on said each of the plurality of computer systems;

receiving, at a particular executor service on a particular computer system of said plurality of computer systems, a plurality of work requests, each work request being associated with a key of a plurality of keys and wherein each of the plurality of keys identifies a particular datum in the distributed computing environment;

defining a plurality of groups of work requests on the particular computer system, each group of work requests comprising one or more work requests having a same key of the plurality of keys; and queueing, on the plurality of threads in the thread pool associated with the particular executor service on the particular computer system, the groups of work requests, each group of work requests being queued on a different thread;

whereby the particular executor service ensures that each of said plurality of work requests associated with a particular datum are processed on a same particular thread of the plurality of threads.

* * * * *